(12) United States Patent
Matsumoto et al.

(10) Patent No.: US 12,046,088 B2
(45) Date of Patent: Jul. 23, 2024

(54) DURABILITY LIFE MANAGEMENT DEVICE OF POWER TRANSMISSION SYSTEM AND DURABILITY LIFE MANAGEMENT METHOD OF POWER TRANSMISSION SYSTEM

(71) Applicant: Isuzu Motors Limited, Tokyo (JP)

(72) Inventors: Kazutaka Matsumoto, Fujisawa (JP); Mitsuhiko Itaya, Fujisawa (JP); Kenta Muranaga, Fujisawa (JP); Masanari Akiyama, Fujisawa (JP); Kazuki Ishimori, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 976 days.

(21) Appl. No.: 16/965,677

(22) PCT Filed: Jan. 16, 2019

(86) PCT No.: PCT/JP2019/000984
§ 371 (c)(1),
(2) Date: Jul. 29, 2020

(87) PCT Pub. No.: WO2019/150941
PCT Pub. Date: Aug. 8, 2019

(65) Prior Publication Data
US 2021/0043014 A1 Feb. 11, 2021

(30) Foreign Application Priority Data
Jan. 31, 2018 (JP) ................................. 2018-015613

(51) Int. Cl.
*G07C 5/08* (2006.01)
*F16H 57/01* (2012.01)

(52) U.S. Cl.
CPC .......... *G07C 5/0816* (2013.01); *F16H 57/01* (2013.01)

(58) Field of Classification Search
CPC ....... G07C 5/0816; F16H 57/01; F16H 59/36; F16H 59/66; F16H 59/14
See application file for complete search history.

(56) References Cited

U.S. PATENT DOCUMENTS

2002/0095985 A1* 7/2002 Genise ............... G01M 13/021
73/162
2004/0083043 A1 4/2004 Akiyama et al.
(Continued)

FOREIGN PATENT DOCUMENTS

JP 2003-346010 12/2003
JP 2004-136816 5/2004
(Continued)

OTHER PUBLICATIONS

International Search Report and the Written Opinion Dated Apr. 16, 2019 From the International Searching Authority Re. Application No. PCT/JP2019/000984 and Its Translation of Search Report Into English. (9 Pages).

*Primary Examiner* — Richard M Camby (57) ABSTRACT

In order to estimate the degree of fatigue in a power transmission system and suitably manage a durability life, this durability life management device of the power transmission system is provided with: an input section which receives an input of vehicle running information including a torque generated by a driving source; a control section which controls the degree of damage to a component of the power transmission system on the basis of the running information and determines, on the basis of the degree of damage, whether the degree of fatigue in the power transmission system is high; and an output section which outputs a signal indicating that the degree of fatigue is high, when the degree of fatigue is determined to be high.

4 Claims, 4 Drawing Sheets

(56) References Cited

U.S. PATENT DOCUMENTS

| | | | |
|---|---|---|---|
| 2008/0224838 A1* | 9/2008 | Rains | F16H 61/12 340/438 |
| 2014/0379199 A1 | 12/2014 | Schulz et al. | |
| 2015/0134189 A1 | 5/2015 | Wash | |
| 2016/0035155 A1* | 2/2016 | Rice | F16H 61/12 701/51 |
| 2017/0335953 A1* | 11/2017 | Fukuda | F16H 61/2807 |

FOREIGN PATENT DOCUMENTS

| | | |
|---|---|---|
| JP | 2004-243924 | 9/2004 |
| JP | 2004-293629 | 10/2004 |
| JP | 2004293629 A * | 10/2004 |
| JP | 2007-239802 | 9/2007 |
| JP | 2013-079920 | 5/2013 |
| JP | 2014-169750 | 9/2014 |
| JP | 2014-181781 | 9/2014 |
| JP | 2015-003722 | 1/2015 |
| WO | WO 2019/150941 | 8/2019 |

* cited by examiner

| Time(sec) | Engine rotation speed (rpm) | | | | | | | |
|---|---|---|---|---|---|---|---|---|
| | ~$Ne_1$ | ~$Ne_2$ | ~$Ne_3$ | ~$Ne_4$ | ~$Ne_5$ | ~$Ne_6$ | ... | ~$Ne_m$ |
| ~$Te_1$ | $S_{11}$ | $S_{21}$ | $S_{31}$ | $S_{41}$ | $S_{51}$ | $S_{61}$ | ... | $S_{m1}$ |
| ~$Te_2$ | $S_{12}$ | $S_{22}$ | $S_{32}$ | $S_{42}$ | $S_{52}$ | $S_{62}$ | ... | $S_{m2}$ |
| ~$Te_3$ | $S_{13}$ | $S_{23}$ | $S_{33}$ | $S_{43}$ | $S_{53}$ | $S_{63}$ | ... | $S_{m3}$ |
| ~$Te_4$ | $S_{14}$ | $S_{24}$ | $S_{34}$ | $S_{44}$ | $S_{54}$ | $S_{64}$ | ... | $S_{m4}$ |
| ~$Te_5$ | $S_{15}$ | $S_{25}$ | $S_{35}$ | $S_{45}$ | $S_{55}$ | $S_{65}$ | ... | $S_{m5}$ |
| ~$Te_6$ | $S_{16}$ | $S_{26}$ | $S_{36}$ | $S_{46}$ | $S_{56}$ | $S_{66}$ | ... | $S_{m6}$ |
| ... | ... | ... | ... | ... | ... | ... | ... | ... |
| ~$Te_n$ | $S_{1n}$ | $S_{2n}$ | $S_{3n}$ | $S_{4n}$ | $S_{5n}$ | $S_{6n}$ | ... | $S_{mn}$ |

Shaft torque (%)

DURABILITY LIFE MANAGEMENT DEVICE OF POWER TRANSMISSION SYSTEM AND DURABILITY LIFE MANAGEMENT METHOD OF POWER TRANSMISSION SYSTEM

TECHNICAL FIELD

The present disclosure relates to a durability life management device for a power transmission system and a durability life management method for a power transmission system.

BACKGROUND ART

Patent Document 1 describes a technique for quantitatively determining a condition of an engine or a transmission. In Patent Document 1, a loaded condition applied to the engine or the transmission is detected by a torque sensor, a vehicle speed sensor, or the like, and a condition of the engine or the transmission is quantitatively determined from a cumulative time or the like when the value of the detected load is greater than a predetermined threshold value.

CITATION LIST

Patent Literature

PTL 1
Japanese Patent Application Laid-Open No. 2004-243924

SUMMARY OF INVENTION

Technical Problem

The technique of Patent Document 1 mainly aims at using the judgment result of the condition of the engine and the transmission for vehicle evaluation information such as vehicle price information. It is also described that the judgment result of the condition of the engine or the transmission is used as a judgment material for performing inspection or maintenance of the vehicle, but how to specifically use it is not described.

It is an object of the present disclosure to provide a durability life management device for the power transmission system and a durability life management method for the power transmission system capable of appropriately managing the durability life by estimating the fatigue degree of the power transmission system.

Solution to Problem

A durable life management device for a power transmission system according to an aspect of the present disclosure comprises an input section for accepting input of running information of a vehicle including torque generated by a drive source, a control section for calculating a degree of damage of a component of the power transmission system based on the running information and determining whether a fatigue degree of the power transmission system is high or not based on the degree of damage, and an output section for outputting a signal indicating that the fatigue degree is high when the fatigue degree is determined to be high.

A durable life management method of a power transmission system according to an aspect of the present disclosure includes the steps of: accepting input of running information of a vehicle including torque generated by a drive source; calculating a degree of damage of a component of the power transmission system based on the running information and determining whether the fatigue degree of the power transmission system is high or not based on the degree of damage; and outputting a signal indicating that the fatigue degree is high when the fatigue degree is determined to be high.

Advantageous Effects of Invention

According to the above aspect, it is possible to appropriately manage the durable life of the power transmission system.

DESCRIPTION OF EMBODIMENT

Hereinafter, embodiments of the present disclosure will be described in detail with reference to the appended drawings. In addition, the embodiment described below is an example, and the present disclosure is not limited to this embodiment.

Figure 1:
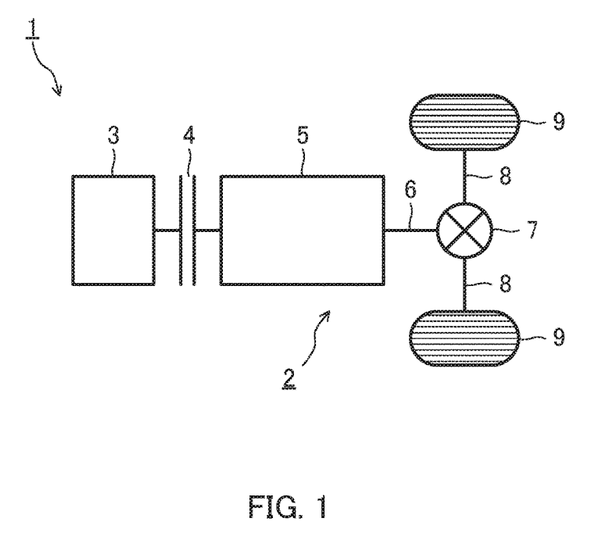
FIG. 1 is a schematic diagram showing an outline of a power transmission system of a vehicle.

First, the schematic of power transmission system 2 of vehicle 1 will be described in detail with reference to FIG. 1. Vehicle 1 includes engine 3, clutch 4, transmission 5, propeller shaft 6, final reduction gear 7, drive shafts 8, 8, and drive wheels 9, 9. In the following description, transmission 5, propeller shaft 6, and final reduction gear 7 are referred to as power transmission system 2. The driving source of vehicle 1 is not limited to engine 3, and power transmission system 2 is not limited to transmission 5, propeller shaft 6, and final reduction gear 7.

Figure 2:
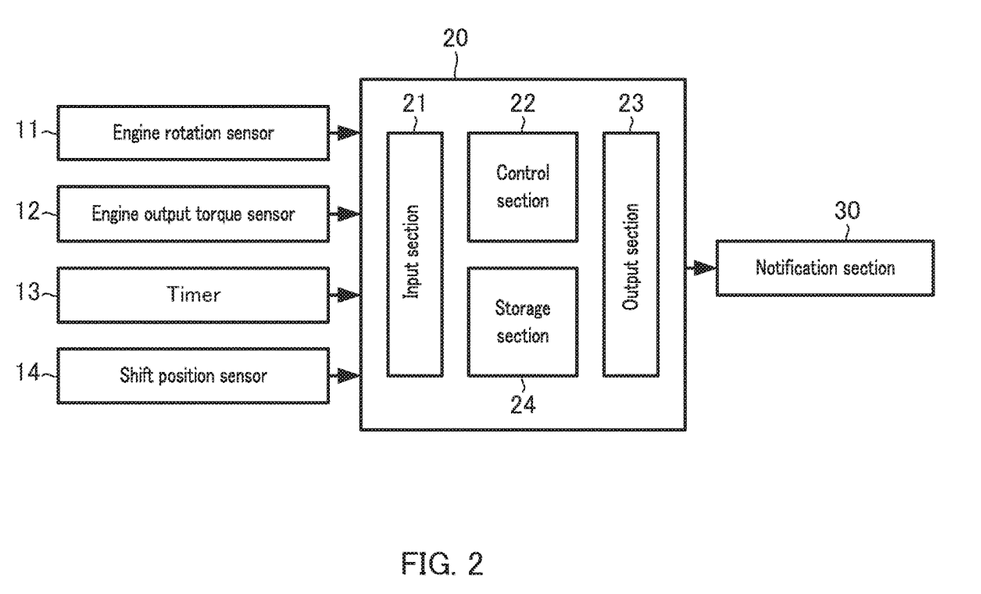
FIG. 2 is a block diagram showing an outline of a durable life management device for a power transmission system according to one embodiment of the present disclosure.

Next, the schematic of durability life management device 20 mounted on vehicle 1 will be described with reference to FIG. 2. Durability life management device 20 includes input section 21, control section 22, output section 23 and storage section 24.

Input section 21 receives the inputs of the engine rotation speed information from engine rotation sensor 11, the engine output torque information from engine output torque sensor 12, the time information from timer 13, and the shift position information from shift position sensor 14.

Control section 22 evaluates the fatigue degree of each member of power transmission system 2 based on the engine rotation speed information, the engine output torque information, the time information, and the shift position information input to input section 21.

Output section 23 outputs a notification signal to notification section 30 based on the evaluation result in control section 22.

Storage section 24 stores various data used in evaluating the fatigue degree of each member of power transmission system 2 in control section 22.

Figure 3:
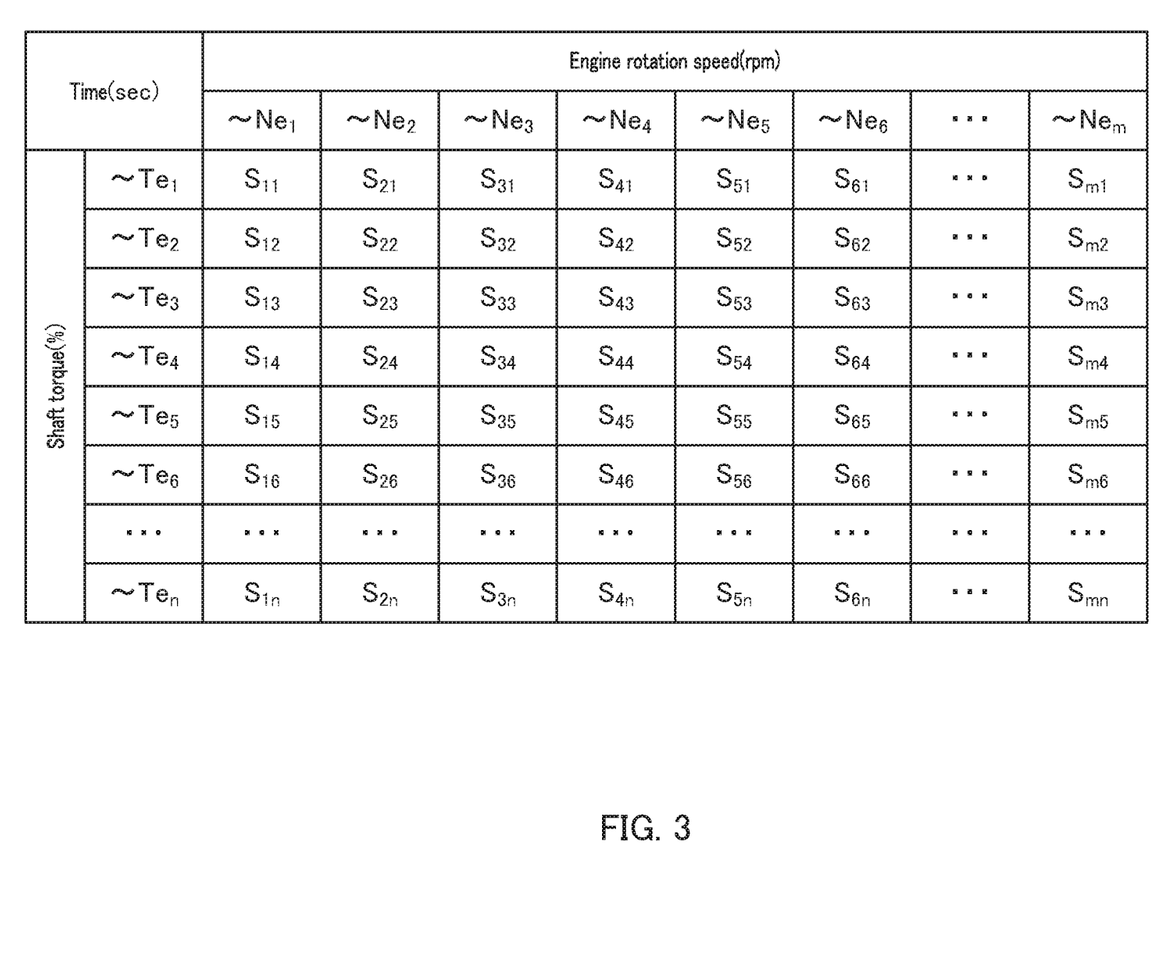
FIG. 3 is a diagram showing one example of a torque frequency table stored in a storage section.

FIG. 3 shows an example of a torque frequency table as an example of data stored in storage section 24. The torque frequency table shown in FIG. 3 is provided for each transmission stage. As shown in FIG. 3, in the torque frequency table, time is accumulated for any combination of engine rotation speed and shaft torque (engine output torque). In other words, the storage section 24 stores what gear stage, engine output torque, and engine rotation speed vehicle 1 has traveled at. In FIG. 3, the shaft torque is shown as a percentage to the maximum output torque of engine 3.

In FIG. 3, for example, it shows that the state where the engines rotate speed is 0 to $Ne_1$ (rpm) and the axis torque is 0 to $Te_1$ (%) is $S_{11}$ (sec). Also, for example, it shows that the state where the engines rotate speed is $Ne_{m-1}$ to $Ne_m$ (rpm) and the axis torque is $Te_{n-1}$ to $Te_n$ (%) is $S_{mn}$ (sec). Note that m and n are natural numbers.

Figure 4:
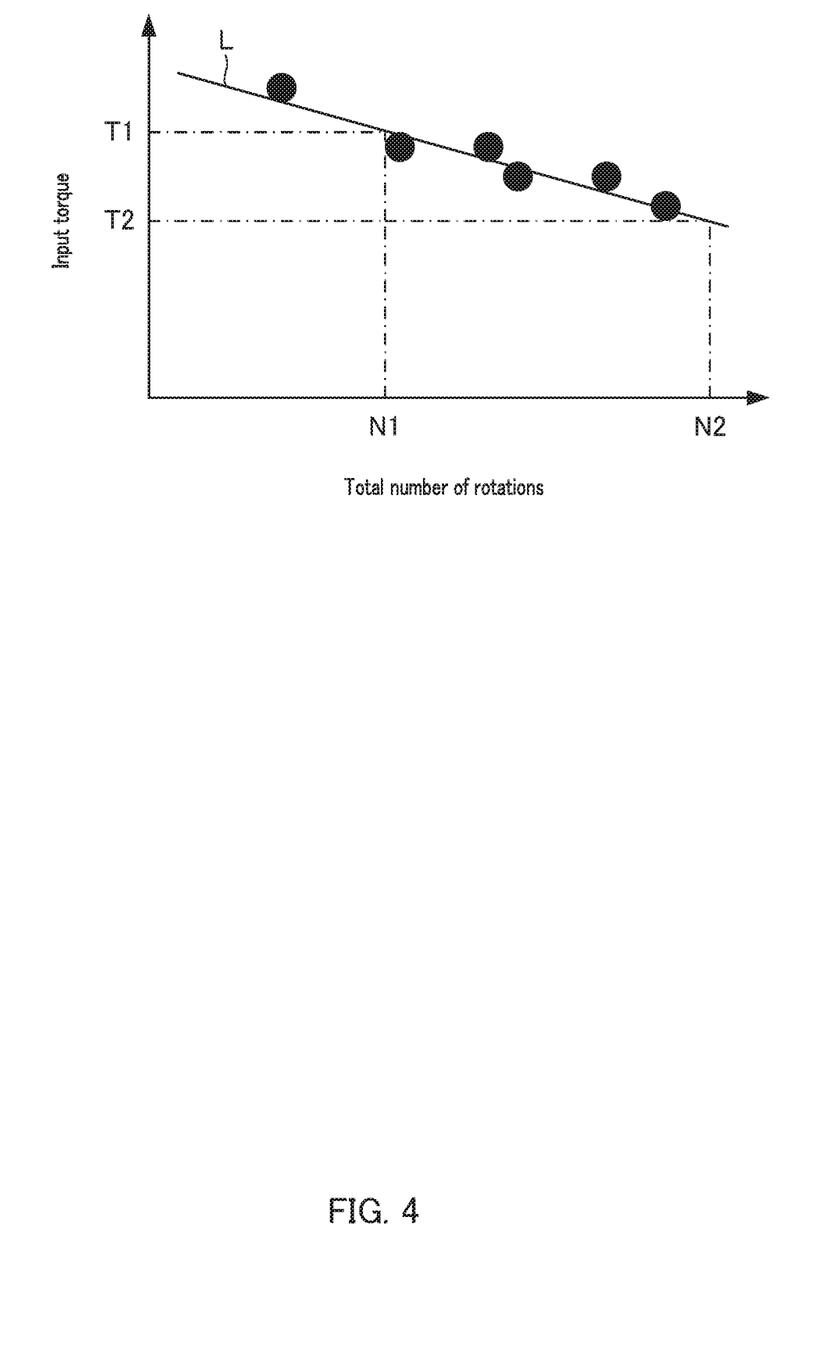
FIG. 4 is a diagram showing one example of the relationship between a torque to be loaded on a member and a durability life.

FIG. 4 shows an example of the relationship between the torque applied to a predetermined member and the durability life. The vertical and horizontal axes in FIG. 4 are both logarithmic scales. Such a relationship can be determined by experiments. Black circles in FIG. 4, when a predetermined member is rotated by loading a predetermined torque, are obtained by plotting the total number of rotations at which the member has been broken. In practice, for all members to be evaluated, the relationship between the torque loaded on the member and the durability life is predetermined by experiments.

The straight line L in FIG. 4 is created based on a plurality of black circles (for example, six black circles in FIG. 4), and indicates a predicted value of the durability life of the member. In the example shown in FIG. 4, when the input torque to the member is T1, the durability life of the member is N1, and when the input torque to the member is T2, the durability life of the member is N2. In addition, the straight line L in FIG. 4 can be expressed by the following equation (1) using torque T, rotation speed N, and constants A and B.

[Equation 1]
$$T = A \times N^{-\frac{1}{B}} \quad (1)$$

Storage section 24 stores constant B in the above equation (1) for all the members to be evaluated. Control section 22 calculates the degree of damage (times) of each member using, for example, the following equation (2).

[Equation 2]

Degree of damage(times) =
$$\left( \frac{\frac{\text{shift torque}(\%)}{100} \times \text{engine maximum torque} \times \text{gear ratio}}{\text{assumed torque}} \right)^{-B} \times \frac{\text{engine rotation speed(rpm)}}{\text{gear ratio} \times 60} \times \text{time(sec)} \quad (2)$$

Equation (2) described above is a conversion equation for converting what various torques have been loaded various times for a predetermined member to how many times a predetermined assumed torque (constant) has been loaded. The shaft torque (%), the engine rotation speed (rpm), and the time (sec) in Equation (2) are parameters in FIG. 3 described above.

In FIG. 3, since the values of the shaft torque and the engine rotation speed having a predetermined width are employed, it is also possible to use the maximum value or average value in the predetermined width as the shaft torque and the engine rotation speed used in equation (2).

The engine maximum torque is a different value depending on the type of engine 3 to be mounted on vehicle 1, and is stored in advance in storage section 24. The assumed torque may be stored in advance in storage section 24 or may be determined when calculating the degree of damage in control section 22.

Further, the gear ratio is a gear ratio from engine 3 to a predetermined member to be evaluated, and is stored in advance in storage section 24. Such a gear ratio varies depending on a predetermined member to be evaluated. In addition, it also varies depending on the model and specifications of transmission 5, the specifications of final reduction gear 7, and the like.

Further, for example, with respect to the components of final reduction gear 7, the gear ratio from engine 3 to the predetermined member to be evaluated varies for each transmission stage in transmission 5. With respect to such a member, it is possible to calculate the total degree of damage by adding the degree of damage calculated for each gear stage.

Control section 22, among the degree of damage of each member obtained in this way, when the degree of damage of any member reaches a predetermined value indicating that it approaches the durability life in the assumed torque (in other words, when reaching a predetermined ratio with respect to the durability life in the assumed torque), determines that the fatigue degree of power transmission system 2 is high, and outputs a signal to output section 23. Such a predetermined value (predetermined ratio) can be determined in consideration of a usage mode, a safety factor, and the like of vehicle 1.

Notification section 30 is, for example, an instrument panel or the like of vehicle 1. The instrument panel or the like indicates that the fatigue degree of power transmission system 2 is high. Notification section 30 may be an alarm or the like.

Figure 5:
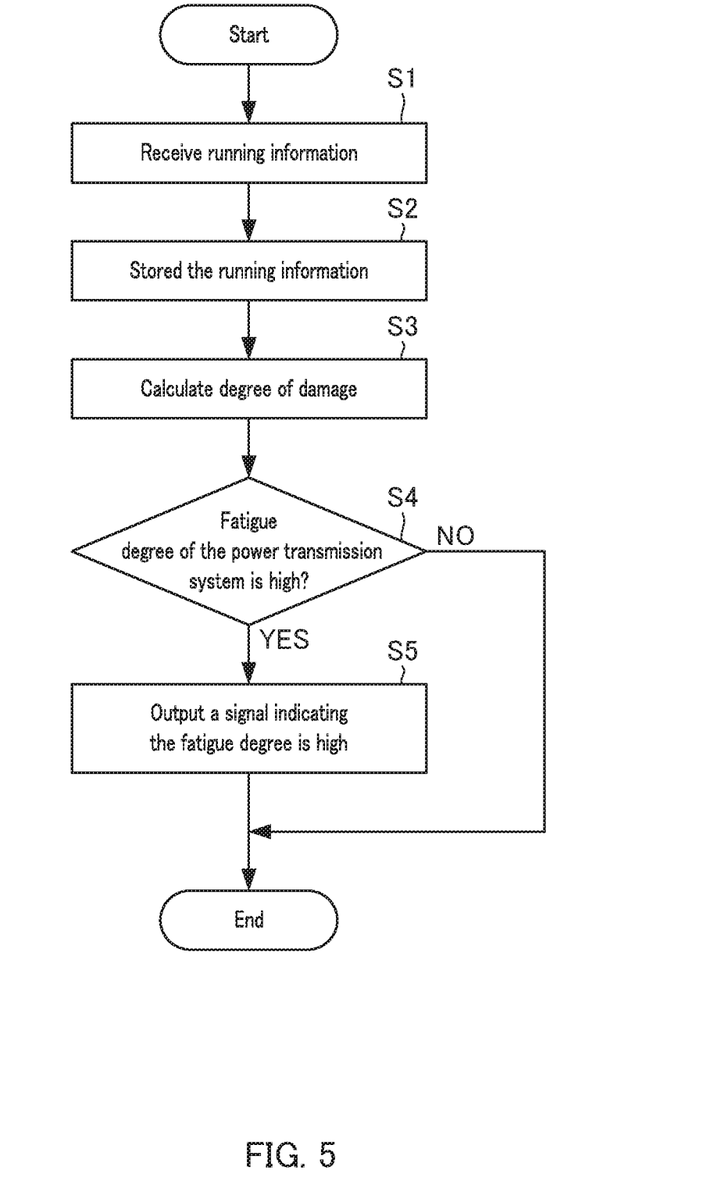
FIG. 5 is a flowchart showing one example of processing performed by a control section.

Next, the processing performed by control section 22 will be described with reference to the flowchart of FIG. 5. The flowchart shown in FIG. 5 is repeatedly executed at a predetermined cycle during the travel of vehicle 1.

First, in step S1, control section 22 receives the running information of vehicle 1, such as the engine rotation speed information, the engine output torque information, the time information, and the shift position information, which are input to input section 21.

In subsequent step S2, control section 22 stores the driving information received from input section 21 in storage section 24.

In subsequent step S3, control section 22 calculates the degree of damage for each member of power transmission system 2 based on the information stored in storage section 24.

In subsequent step S4, control section 22 determines whether the fatigue degree of power transmission system 2 is high or not.

If it is determined in step S4 that the fatigue degree of power transmission system 2 is high (step S4:YES), the processing proceeds to step S5. Then, in step S5, the control section 22 outputs a signal indicating that the fatigue degree of the power transmission system 2 is high with respect to output section 23, and ends the processing.

On the other hand, in step S4, if the fatigue degree of power transmission system 2 is not determined to be high (step S4:NO), control section 22 ends the processing without outputting a signal indicating that the fatigue degree of power transmission system 2 is high with respect to output section 23.

As described above, according to the present embodiment, durability life management device 20 is provided, which comprises input section 21 for accepting the input of the running information of the vehicle including the torque generated by the drive source, control section 22 for calculating the degree of damage of the components of the power transmission system based on the running information and determining whether the fatigue degree of the power transmission system is high or not based on the degree of damage, and output section 23 for outputting a signal indicating that the fatigue degree is high when the fatigue degree is determined to be high.

Thus, by quantitatively calculating the degree of damage of each member of the power transmission system, it is possible to inform the driver or the like that the fatigue degree of the power transmission system is high. Therefore, the durability life of the power transmission system can be appropriately managed.

(Variation of Notification Timing)

A variation of the notification timing will be described. As the notification timing, first, as described above, there is an aspect that, when the degree of damage reaches a predetermined value indicating that it approaches the durability life, or when the degree of damage reaches a predetermined ratio with respect to the durability life, the fatigue degree of the power transmission system is determined to be high, and the notification is performed.

Second, depending on the usage mode of the vehicle, it is possible to change the threshold value to determine that the fatigue degree of the power transmission system is high. The usage of the vehicle may vary greatly depending on the driver. For example, some drivers use such that the degree of damage reaches about half of the durability life with running time t1 (or running distance d1), while others use such that the degree of damage reaches about half of the durability life with running time t2 (>t1) (or running distance d2 (>d1)).

The period to reach to the durability life differs between the case where the degree of damage reaches about half of the durability life with running time t1 (or running distance d1) and the case where the degree of damage reaches about half of the durability life with running time t2 (or running distance d2).

Therefore, in the case where the degree of damage reaches about half of the durability life with running time t1 (or running distance d1), it may be determined that the fatigue degree of the power transmission system is high at a timing at which the degree of damage is lower compared with the case where the degree of damage reaches about half of the durability life with running time t2 (or running distance d2).

That is, the predetermined value or the predetermined ratio mentioned above may be changed based on the degree of change in the degree of damage with respect to the predetermined running time or the running distance. By doing so, regardless of the usage mode of the vehicle, it is possible to perform a notification at an appropriate timing, and therefore, to appropriately manage the durability life. It should be noted that "about half" is merely an example. It is not limited to this.

Third, the notification timing can be changed in consideration of the remaining life. For example, in the case where the vehicle is continuously used in the most recent usage mode of the vehicle, when a predetermined value indicating that the degree of damage approaches the durability life or a remaining time (or a remaining distance) to reach to the durability life is less than the predetermined margin time (or the margin distance), it may be determined that the degree of fatigue of the power transmission system is high, and a notification may be performed.

That is, the remaining time for the degree of damage to reach the predetermined value or the predetermined ratio mentioned above is estimated based on the degree of change of the degree of damage with respect to the predetermined running time or the running distance. When the remaining time is shorter than the predetermined margin time, the fatigue degree may be determined to be high. By doing so, regardless of the usage mode of the vehicle, it is possible to perform a notification at an appropriate timing, and therefore, to appropriately manage the durability life.

(Modification of the Notification Target)

A modification of the notification target will be described. As the notification target, firstly, as described above, a driver who is driving a vehicle can be cited. In this case, it is possible to perform a notification directly to the driver driving the vehicle that the fatigue degree of the power transmission system is high.

Second, when the vehicle is managed by an administrator, it is possible to perform a notification to the administrator that the fatigue degree of the power transmission system is high. Specifically, it is possible to perform a notification to the administrator that the fatigue degree of the power transmission system is high via wireless communication or the like. In this way, the administrator can appropriately grasp the condition of the vehicle.

Third, it is possible to perform a notification to dealers or the like, who perform vehicle maintenance that the fatigue degree of the power transmission system is high. In this case, similarly to the second example, it is possible to perform a notification that the fatigue degree of the power transmission system is high via wireless communication or the like.

Further, at the timing of performing maintenance, a predetermined device is connected to the durability life management device, it may be output a signal notifying that the fatigue degree of the power transmission system is high from the durability life management device to the predetermined device. In this way, it is possible to perform the replacement or the like of the member of the power transmission system at an appropriate timing.

(Variation of the Method of Calculating the Degree of Damage)

A modification of the method of calculating the degree of damage will be described. As a method of calculating the degree of damage, first, as described above, a method of converting various torques loaded on the member into a predetermined assumed torque is exemplified.

Second, a method is provided, which includes calculating the ratio of the degree of damage (times) to the fatigue life in the torque for each of the various torques loaded on the member, and then calculating the damage ratio by adding them. In this case, regarding the torque in which the experimental result of fatigue life exists, the damage ratio to fatigue life can be calculated more accurately, which is useful.

(Other Modifications)

In the above-described embodiment, the configuration is used to calculate the total number of rotations of the engine based on the engine rotation speed and time, but is not limited thereto. For example, the total number of rotations of the engine may be directly detected.

This application is based on Japanese Patent Application No. 2018-015613, filed on Jan. 31, 2018, the contents of which are incorporated herein by reference.

INDUSTRIAL APPLICABILITY

According to the durability life management device of the power transmission system and the durability life management method of the power transmission system of the present disclosure, it is possible to appropriately manage the durability life of the power transmission system. They are highly industrially applicable.

REFERENCE SIGNS LIST

1 Vehicle
2 Power transmission system
3 Engine
4 Clutch
5 Transmission
6 Propeller shaft
7 Final reduction gear
8 Drive shaft
9 Drive wheel
11 Engine rotation sensor
12 Engine output torque sensor
13 Timer
14 Shift position sensor
20 Durability life management device
21 Input section
22 Control section
23 Output section
24 Storage section
30 Notification section

What is claimed is:

1. A durability life management device for a power transmission system comprising:
an input section for accepting an input of running information of a vehicle including an engine rotation speed information, an engine output torque information, a time information, and a shift position information generated by a drive source;
a control section for comparing a degree of damage of the components of the power transmission system calculated based on the running information with a predetermined value and determining whether a fatigue degree of the power transmission system is high or not; and
an output section for outputting a signal indicating that the fatigue degree is high when the fatigue degree is determined to be high,
a notification section on an instrument panel of the vehicle receiving the notification signal on the vehicle,
wherein the control section determines the predetermined value based on a degree of change of the degree of damage with respect to a predetermined running time or a running distance,
wherein the control section, among the degree of damage of the components, when the degree of damage of any member reaches the predetermined value, determines that the fatigue degree of the power transmission system is high.

2. A durability life management device for a power transmission system comprising:
an input section for accepting an input of running information of a vehicle including an engine rotation speed information, an engine output torque information, a time information, and a shift position information generated by a drive source;
a control section for comparing a degree of damage of the components of the power transmission system calculated based on the running information with a threshold and determining whether a fatigue degree of the power transmission system is high or not; and
an output section for outputting a signal indicating that the fatigue degree is high when the fatigue degree is determined to be high,
a notification section on an instrument panel of the vehicle receiving the notification signal on the vehicle,
wherein the control section estimates a remaining time for the degree of damage to reach the threshold based on a degree of change of the degree of damage with respect to a predetermined running time or a running distance, and determines that the fatigue degree is high when the remaining time is shorter than a predetermined margin time.

3. A durability life management method for a power transmission system including:
accepting an input of running information of a vehicle including an engine rotation speed information, an engine output torque information, a time information, and a shift position information generated by a drive source;
comparing a degree of damage of the components of the power transmission system calculated based on the running information with a predetermined value and determining whether a fatigue degree of the power transmission system is high or not; and
outputting a signal indicating that the fatigue degree is high when the fatigue degree is determined to be high, for presentation on a notification section of an instrument panel of the vehicle,
wherein in the step of comparing, the predetermined value is determined based on a degree of change of the degree of damage with respect to a predetermined running time or a running distance,
wherein in the step of comparing, it is determined, among the degree of damage of the components, when the degree of damage of any member reaches the predetermined value, that the fatigue degree of the power transmission system is high.

4. A durability life management method for a power transmission system including:
accepting an input of running information of a vehicle including a torque an engine rotation speed information, an engine output torque information, a time information, and a shift position information generated by a drive source;
comparing a degree of damage of the components of the power transmission system calculated based on the running information with a threshold and determining whether a fatigue degree of the power transmission system is high or not; and
outputting a signal indicating that the fatigue degree is high when the fatigue degree is determined to be high for presentation on a notification section of an instrument panel of the vehicle,
wherein in the step of comparing, a remaining time for the degree of damage to reach the threshold is estimated based on a degree of change of the degree of damage with respect to a predetermined running time or a running distance, and it is determined that the fatigue degree is high when the remaining time is shorter than a predetermined margin time.

\* \* \* \* \*